(12) United States Patent
Hagspiel

(10) Patent No.: US 11,519,440 B2
(45) Date of Patent: Dec. 6, 2022

(54) DOWEL FOR FASTENING FITTING PARTS

(71) Applicant: Julius Blum GmbH, Hoechst (AT)

(72) Inventor: Dominik Hagspiel, Hoechst (AT)

(73) Assignee: JULIUS BLUM GMBH, Hoechst (AT)

( * ) Notice: Subject to any disclaimer, the term of this patent is extended or adjusted under 35 U.S.C. 154(b) by 565 days.

(21) Appl. No.: 16/672,792

(22) Filed: Nov. 4, 2019

(65) Prior Publication Data

US 2020/0063777 A1    Feb. 27, 2020

Related U.S. Application Data

(63) Continuation of application No. PCT/AT2018/000022, filed on Apr. 17, 2018.

(30) Foreign Application Priority Data

May 11, 2017    (AT) ................ A 50399/2017

(51) Int. Cl.
*F16B 12/24*    (2006.01)
*A47B 88/90*    (2017.01)
(Continued)

(52) U.S. Cl.
CPC ............ *F16B 12/24* (2013.01); *A47B 88/941* (2017.01); *E05D 5/02* (2013.01); *E05Y 2900/20* (2013.01); *F16B 2012/103* (2013.01)

(58) Field of Classification Search
CPC ................ F16B 12/24; F16B 2012/103; F16B 2013/009; A47B 88/941;
(Continued)

(56) References Cited

U.S. PATENT DOCUMENTS 3,267,793 A * 8/1966 Devine ............... F16B 19/1063
411/959
3,421,404 A * 1/1969 Jacobs .................. F16B 13/066
411/65

(Continued)

FOREIGN PATENT DOCUMENTS

CN    2382876    6/2000
CN    102595969    7/2012
(Continued)

OTHER PUBLICATIONS

Office Action dated Jun. 14, 2021 in Japanese Patent Application No. 2019-561917, with English-language translation.
(Continued)

*Primary Examiner* — Hanh V Tran
(74) *Attorney, Agent, or Firm* — Wenderoth, Lind & Ponack, LLP

(57) ABSTRACT

A dowel for fastening fitting parts of pieces of furniture, including: a dowel sleeve; at least one fastening claw separate from the dowel sleeve; and a spreading element movable axially in the dowel sleeve and intended for radially spreading the at least one fastening claw and the dowel sleeve. The dowel sleeve has a guide which laterally guides a retaining portion of the fastening claw, and a latching element which retains the fastening claw, which is inserted into the guide, on the dowel sleeve, preferably with play. The spreading element can be connected to at least one fastening claw, preferably to all fastening claws.

34 Claims, 22 Drawing Sheets

(51) Int. Cl.
*E05D 5/02* (2006.01)
*F16B 12/10* (2006.01)

(58) Field of Classification Search
CPC .... A47B 2220/0072; A47B 2230/0033; A47B 2230/0044; A47B 2230/0051; A47B 2095/006; E05D 5/02; E05D 5/08; E05Y 2900/20
See application file for complete search history.

(56) References Cited

U.S. PATENT DOCUMENTS

| | | | | |
|---|---|---|---|---|
| 3,505,922 | A * | 4/1970 | Tinnerman | F16B 37/043 411/182 |
| 4,033,222 | A * | 7/1977 | Wilson | F16B 5/02 411/33 |
| 4,691,889 | A * | 9/1987 | Richards | F16B 7/0413 411/33 |
| 5,246,322 | A * | 9/1993 | Salice | F16B 12/2027 411/15 |
| 5,813,808 | A * | 9/1998 | Wu | F16B 13/066 411/24 |
| 5,839,164 | A * | 11/1998 | Cress | E05D 5/08 16/382 |
| 6,012,886 | A * | 1/2000 | Tanamura | F16B 13/068 411/24 |
| 6,081,970 | A * | 7/2000 | Wasilewski | E05D 7/125 16/383 |
| 6,106,185 | A | 8/2000 | Isele et al. | |
| 6,148,569 | A * | 11/2000 | Giovannetti | F16B 7/046 403/231 |
| 6,676,348 | B2 | 1/2004 | Hoppe | |
| 6,904,645 | B1 * | 6/2005 | Lautenschlager | E05D 7/0415 16/382 |
| 8,393,124 | B2 | 3/2013 | Zimmer et al. | |
| 8,967,902 | B2 | 3/2015 | Raich et al. | |
| 9,016,975 | B2 | 4/2015 | Raich et al. | |
| 11,248,645 | B2 * | 2/2022 | Figge | F16B 37/067 |
| 2001/0022924 | A1 * | 9/2001 | Wieser | F16B 37/122 411/60.1 |
| 2003/0108397 | A1 | 6/2003 | Hoppe | |
| 2005/0058522 | A1 * | 3/2005 | Hughes | F16B 13/146 411/82 |
| 2005/0196249 | A1 * | 9/2005 | Huang | E05D 5/0276 411/60.1 |
| 2008/0031702 | A1 * | 2/2008 | Chen | F16B 37/122 411/182 |
| 2009/0220318 | A1 * | 9/2009 | Schael | F16B 12/24 411/82.1 |
| 2010/0180535 | A1 | 7/2010 | Zimmer et al. | |
| 2011/0005032 | A1 * | 1/2011 | Domenig | E05F 5/006 16/50 |
| 2011/0030172 | A1 * | 2/2011 | Liang | E05D 7/123 16/383 |
| 2012/0054992 | A1 * | 3/2012 | Liu | F16B 12/24 24/573.11 |
| 2012/0195708 | A1 | 8/2012 | Raich et al. | |
| 2012/0201626 | A1 * | 8/2012 | Raich | E05D 5/08 411/54 |
| 2014/0096343 | A1 * | 4/2014 | Motosugi | E05D 5/0276 16/387 |
| 2014/0341644 | A1 * | 11/2014 | Maertens | F16B 21/086 403/297 |
| 2015/0252831 | A1 * | 9/2015 | Deman | F16B 12/2009 403/374.2 |
| 2015/0337577 | A1 * | 11/2015 | Peer | E05D 7/0423 16/237 |
| 2017/0021964 | A1 * | 1/2017 | Koelling | A47B 47/042 |
| 2017/0122359 | A1 * | 5/2017 | Foerster, Jr. | F16B 37/127 |
| 2018/0066690 | A1 * | 3/2018 | Zimmer | F16B 21/20 |
| 2018/0106282 | A1 * | 4/2018 | Cuddy | E04C 2/44 |
| 2018/0155974 | A1 * | 6/2018 | Kirenci | E05F 5/006 |
| 2019/0195258 | A1 * | 6/2019 | Zimmer | F16B 13/0858 |

FOREIGN PATENT DOCUMENTS

| | | | |
|---|---|---|---|
| DE | 20 2015 105 329 | 2/2017 | |
| EP | 3 153 721 | 4/2017 | |
| ES | 1 039 127 | 10/1998 | |
| JP | 5-006704 | 6/1930 | |
| JP | 6-288406 | 10/1994 | |
| JP | 08326713 A * | 12/1996 | .............. E05D 5/02 |
| JP | 9-1510 | 1/1997 | |
| JP | 10-159822 | 6/1998 | |
| JP | 10-243894 | 9/1998 | |
| JP | 10-313963 | 12/1998 | |
| JP | 2003-535277 | 11/2003 | |
| JP | 2013-507541 | 3/2013 | |
| JP | 2016-56824 | 4/2016 | |
| JP | 2018-535368 | 11/2018 | |
| JP | 2019044342 A * | 3/2019 | |
| WO | 2015/037264 | 3/2015 | |
| WO | 2017/059471 | 4/2017 | |

OTHER PUBLICATIONS

Search Report dated Oct. 30, 2020 in Chinese Patent Application No. 201880040490.4.
International Search Report dated Jul. 5, 2018 in International (PCT) Application No. PCT/AT2018/000022.
English translation of Search Report dated Feb. 26, 2019 in Taiwanese Application No. 107114844.

* cited by examiner

A-A

FIG. 20a    A-A (2:1)
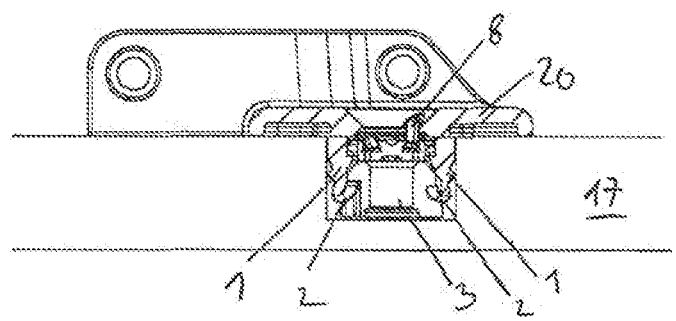
FIG. 20b
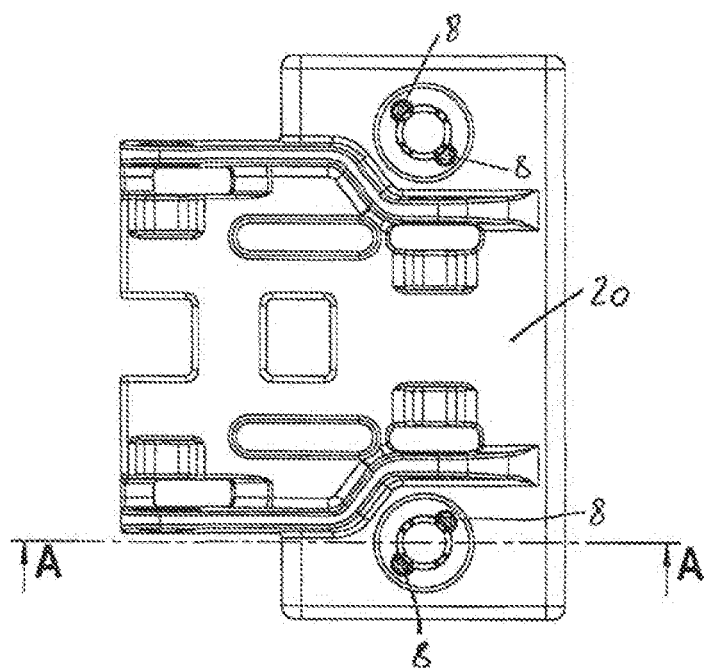

FIG. 22a  A-A (2:1)
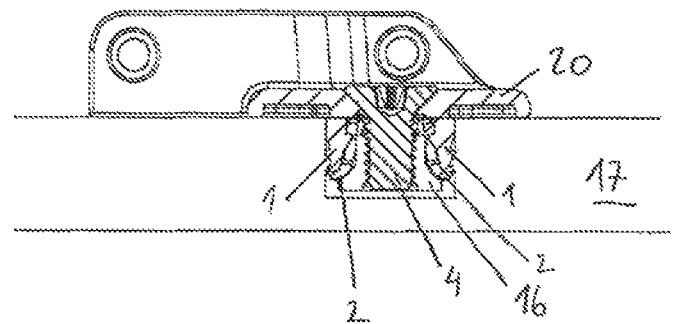
FIG. 22b
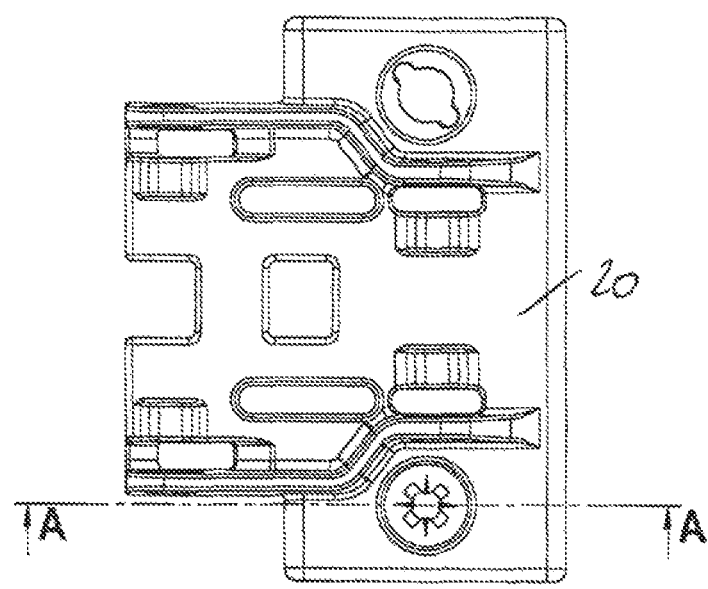

DOWEL FOR FASTENING FITTING PARTS

BACKGROUND OF THE INVENTION

The invention concerns a dowel for fastening fitments of articles of furniture comprising a dowel sleeve, at least one fastening claw separate from the dowel sleeve, and a spreading element which is moveable axially in the dowel sleeve for radially spreading the at least one fastening claw and the dowel sleeve. The invention further concerns a fitment for an article of furniture having such a dowel and an article of furniture equipped with such a fitment. Finally the invention also concerns a method of producing a dowel.

Dowels are known in the furniture industry in order to be inserted into pre-drilled receiving means and spread therein by being spread open by means of pulling element which is supported against a fitment, and thus secured in the article of furniture. Ultimately that achieves a fixed connection for the fitment to an article of furniture. The pulling element is frequently a screw with a screw head of any desired configuration, for example a screw cross head, a socket screw head, a Torx screw head or the like. The spreading element of the dowel is tightened up by tightening the screw and the dowel is spread in the radial direction in the bore.

SUMMARY OF THE INVENTION

The object of the invention is to provide a dowel of the general kind set forth in the opening part of this specification, which achieves a good hold in different materials and which is distinguished by small dimensions, in particular a short length (measured in the direction of insertion) and which can thus also be used in relation to thin-wall furniture materials.

In the case of the dowel according to the invention, the fastening claw can best be inserted into the interior of the dowel sleeve from the underside of the dowel, that faces away from the fitment, in which case the guide provides for lateral centering of the inserted fastening claw. A simple connection by way of latching means then involves snapping the latching claw into engagement whereby it is connected to the dowel sleeve in a simple fashion, preferably with play, for a later movement upon being tightened. It is possible to achieve a compact dowel construction in a simple fashion using a few components by virtue of simple guides, in particular in the form of projections at the inside of the dowel sleeve and by virtue of simple latching means, in particular latching pins, which project from the interior of the dowel sleeve and latchingly engage into corresponding latching openings in a holding portion of the fastening claw.

A particularly preferred embodiment is one in which there are provided at least two separate, preferably four pair-wise oppositely disposed fastening claws, in which respect it is desirable if for each fastening claw the dowel sleeve has a dedicated separate guide and dedicated separate latching means. In that way the individual fastening claws can be connected to the dowel sleeve substantially independently and separately from each other. Four fastening claws makes it possible to achieve good circumferential distribution of the fastening claws over the entire circumference of the dowel sleeve.

In a variant, the spreading element is only indirectly fastened to the dowel sleeve, more specifically by way of the fastening claws, which in turn are latched to the dowel sleeve. In this variant the fastening claws perform a dual function. On the one hand they are latched and moveably mounted to the dowel sleeve and upon being spread open can either engage themselves in the material of the bore or urge the dowel sleeve radially outwardly so that the dowel sleeve is retained with its projections or ribs in the material of the bore. On the other hand the fastening claws at the same time also serve as a holding means for the spreading element which in turn is moveable by way of a pulling element which does not form part of the dowel, for example a screw or a pulling mechanism involving an eccentric. That structure makes it possible to produce an inexpensive dowel which is of compact dimensions with few components, and which is also suitable for insertion into thin panels or materials, in particular of an article of furniture. Those panels only have to be of a thickness of somewhat more than 5 mm to 8 mm, preferably about more than 6 mm, because with the dowel according to the invention it is possible to achieve dimensions, in respect of which the non-spread dowel is of a length as measured in the direction of insertion of 5 mm to 8 mm, preferably about 6 mm. By virtue of the construction according to the invention it is possible to provide a dowel in which the length (once again measured in the direction of insertion into the bore) is less than the diameter, preferably even less than 70% of the diameter.

The invention also concerns a fitment for an article of furniture which is equipped with such a dowel, wherein the dowel with pulling device, for example a screw, can be pre-fitted to the fitment. That avoids loose parts, which is advantageous in particular because the dowel according to the invention is of very small dimensions, at any event in the region of far below 1 cm. In most cases the fitment will have two or more dowels which fit into prefabricated bores at the correct spacings in accordance with a predetermined bore pattern. In that way it is now only necessary to fit the fitment to the furniture part, for example a door, flap or drawer or a furniture carcass, push the dowels into the bore and then spread them by tightening the pulling means, whereby the fitment is fixedly held to the article of furniture.

So that the dowel, when using a screw as the pulling element, does not also rotate therewith, it can be provided in accordance with a preferred configuration that the fitment has at least one recess which is not rotationally symmetrical and through which the pulling element extends and into which at least one anti-rotation pin engages beside the pulling element.

With the depicted method a plurality of fastening claws can be inserted successively in respect of time and latched in a preferably one-piece dowel sleeve of plastic. Those fastening claws preferably comprise metal.

It is then possible to insert into the combination of dowel sleeve and fastening claws a spreading element which in turn latches to the fastening claws. In total therefore no more components than the components referred to are used. When employing four fastening claws therefore the arrangement manages with a total of six components: the dowel sleeve, the four fastening claws and the spreading element. There is no need for further separate spindles or connecting elements.

BRIEF DESCRIPTION OF THE DRAWINGS

Further details of the present invention are described more fully hereinafter with reference to the accompanying specific description:

FIGS. 20a, 20b are a sectional view and a plan view, respectively, of a connecting plate of hinge with two dowels disposed therebeneath, with an anti-rotation means, FIGS. 22a, 22b are the same views as FIGS. 21a, 21b but in the spread state of the dowel.

DETAILED DESCRIPTION OF THE INVENTION

Figure 1:
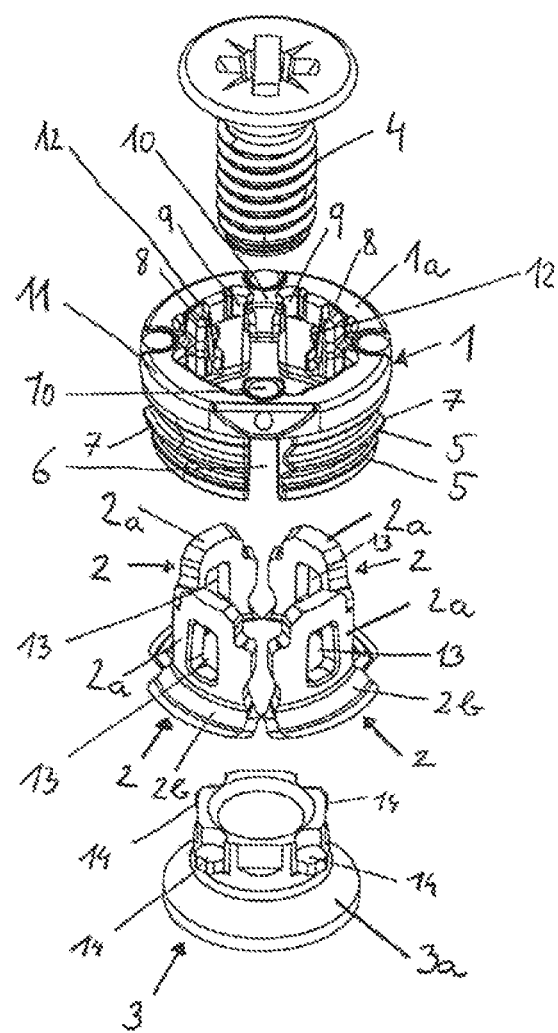
FIG. 1 is an exploded view of an embodiment of a dowel according to the invention together with a preferred pulling element in the form of a screw.

The dowel shown in FIG. 1 comprises six parts, namely the dowel sleeve 1, the four fastening claws 2 and the spreading element 3. In addition FIG. 1 also shows a screw 4 which engages into a female thread in the spreading element 3 and thus as a pulling element pulls that spreading element 3 upwardly and thus spreads the dowel, as will be described in greater detail hereinafter.

The dowel sleeve 1 preferably comprises plastic, in particular an injection molding. In that way it is possible to produce more complicated shapes like the latching element guides and anti-rotation element described hereinafter, in one piece.

In addition, by virtue of the relatively soft material properties, the plastic affords a good hold in a bore of hard material when the outer holding projections 5 of holding tabs 7 bear snugly against same.

The fastening claws 2 are made of metal, in which case stock keeping is minimized and manufacture is facilitated by virtue of the similar configuration of all fastening claws 2. Metal permits in particular the formation of cutting portions 2b which project with a sharp edge and which when the dowel is spread open can penetrate particularly well into soft materials and guarantee a secure hold there.

The spreading element 3 also preferably comprises metal and is also made in one piece. It has a conical or tapered surface 3a which when the spreading element is axially tightened by the pulling element 4 (screw) bears at the inside against the fastening claws 2 and urges them radially outwardly. As the fastening claws are increasingly pressed outwardly they then entrain radially outwardly therewith the holding tabs 7 of the dowel sleeve 1, that are separated by gaps, whereby the dowel sleeve 1 with the holding tabs 7 and holding projections 5 is also spread.

The dowel sleeve 1 shown in FIG. 1 has an anti-rotation means in the form of two pins 8 which projects beyond the top side 1a and which are described in greater detail hereinafter.

In its interior the dowel sleeve 1 has a respective guide 9 for each fastening claw 2. That guide 9 is formed by inwardly facing projections 10 which define a portion of undercut configuration, into which the holding portions 2a of the fastening claws 2 can be inserted. In the regions of the dowel sleeve 1 of undercut configuration, the guides 9 respectively embrace in a C-shape the holding portions 2a of the fastening claw 2, more specifically only in the upper region of the dowel sleeve 1, where it has a continuous ring 11. In the embodiment shown in FIG. 1, therefore, the inserted fastening claws 2 are held at the top at the height of the ring on the inside in guides 9 and respectively laterally in the dowel sleeve 1.

In that case, the holding action to prevent the fastening claws 2 from dropping out of the dowel sleeve 1 is implemented by a latching element which includes latching pins 12 projecting inwardly in the dowel sleeve 1 (there being four in number thereof), which respectively engage into corresponding latching openings 13 in the holding portions 2a of the fastening claws 2.

When the spreading element 3 is inserted from below, the spreading element 3 also latches by a latching connection to the four fastening claws 2, in which case that latching connection provides radially protruding latching projections 14 on the spreading element 3, which respectively engage into the latching openings 13 of the fastening claws 2. Accordingly in total there are two components in engagement in relation to each fastening claw 2, once from the outside by the latching pins 12 of the dowel sleeve 1 and once from the inside by the latching projections 14 of the spreading element 3. With the spreading element 3 inserted, the fastening claws 2 can then no longer pivot further inwardly and can thus no longer disengage from the latching pin 12. A certain mobility of the fastening claws 2 in relation to the dowel sleeve 1 is maintained however—on the one hand due to a play in the lateral guides 9 and on the other hand due to a play in the latching element connection (latching pin 12 in latching opening 13). The latching projections 14 of the spreading element 3, which are inserted with play, also permit a relative mobility of the spreading element 3 with respect to the fastening claws 2.

Figure 2A:
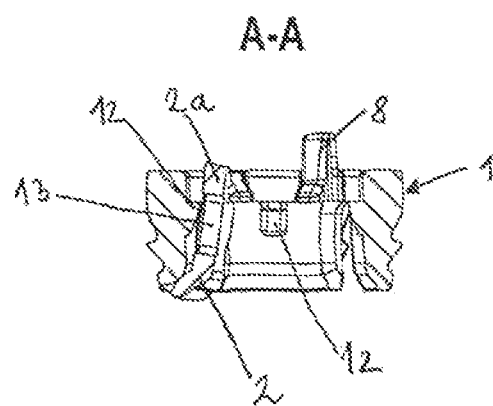
FIG. 2a shows a corresponding section along line A-A in FIG. 2b, FIGS. 3a, 3b are the same types of view as FIG. 2a, 2b, wherein however snapping engagement of the fastening claw by pivotal movement in the counter-clockwise direction on to a latching means in the dowel sleeve has progressed further; in addition FIGS. 3a, 3b already show three further fastening claws which have been completely snapped into position, FIGS. 4a, 4b showing the left-hand fastening claw which has been further snapped into position.
Figure 2B:
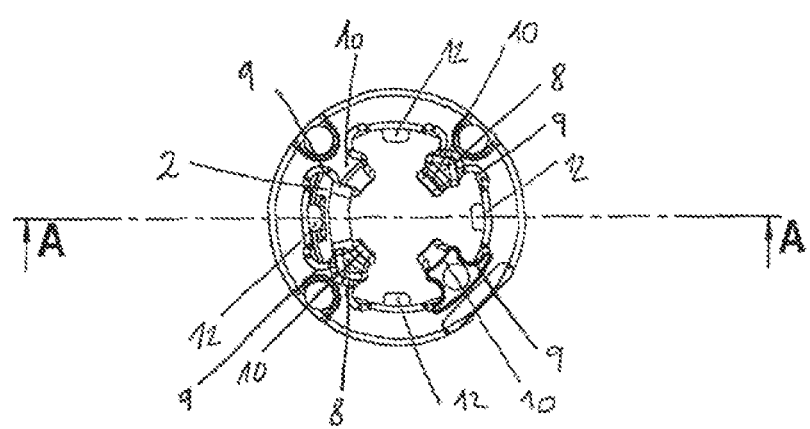
FIG. 2b is a plan view of an embodiment of a dowel according to the invention with an anti-rotation means in a first production step in which only one fastening claw is inserted.
Figure 3A:
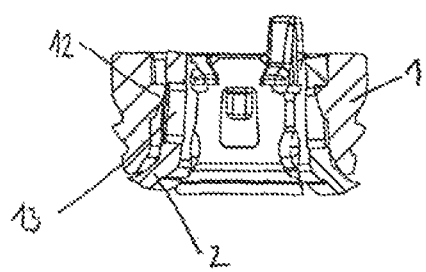
Figure 3B:
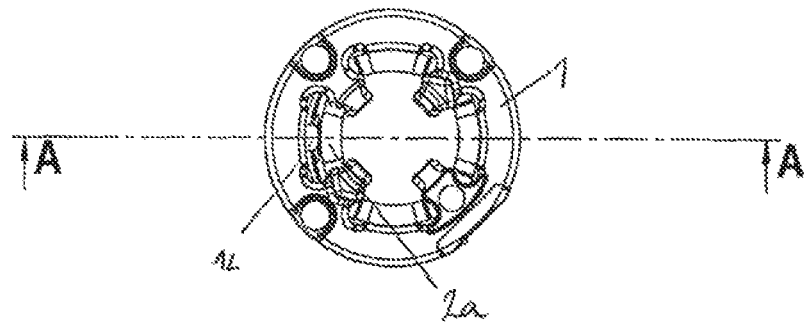
Figure 4A:
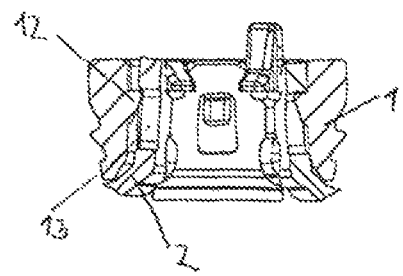
Figure 4B:
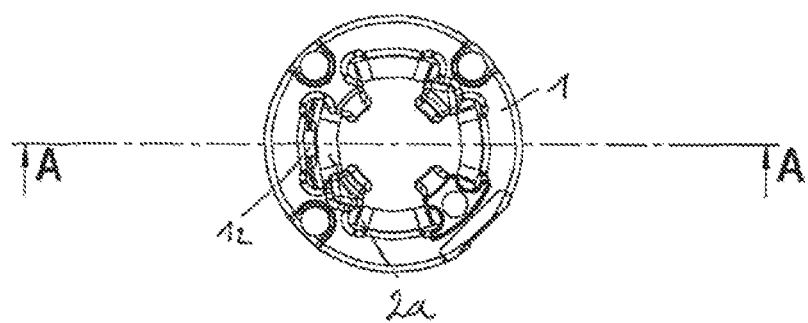
Figure 5A:
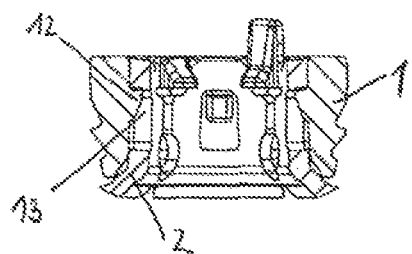
FIGS. 5a, 5b show the left fastening claw completely snapped into position and thus show all four fastening claws snapped into engagement in the dowel sleeve, FIGS. 6a-6c respectively are a sectional view, a plan view and a side view illustrating insertion of the spreading element into the dowel sleeve already fitted with four fastening claws.
Figure 5B:
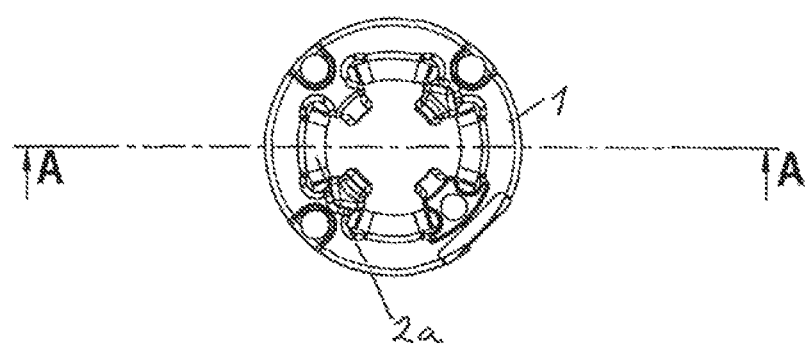

FIGS. 2a and 2b show a first step in the production of an embodiment of dowel according to the invention, in which one of the four fastening claws is inserted but not yet latched. As FIG. 2a shows the fastening claw 2 is inserted slightly inclinedly from below and then, as FIGS. 3a and 3b, 4a and 4b and 5a and 5b show, pivoted in the counter-clockwise direction, whereby the upper region of the holding portion penetrates at the top in the region of the ring 11 of the dowel sleeve 1 into the guides 9 of the slightly undercut configuration and the latching projection 12 on the dowel sleeve side engages into the latching opening 13 of the fastening claw 2.

The other three of the total of four fastening claws 2 are preferably inserted and latched in succession in respect of time, as is shown by means of the left-hand fastening claw 2 in FIGS. 2a and 2b, 3a and 3b, 4a and 4b and 5a and 5b. FIGS. 3a, 3b, 4a, 4b and 5a, 5b show the other three fastening claws 2 when already in the finished fitted state. As already mentioned however fastening of the claws is preferably effected in succession in individual steps.

Figure 6A:
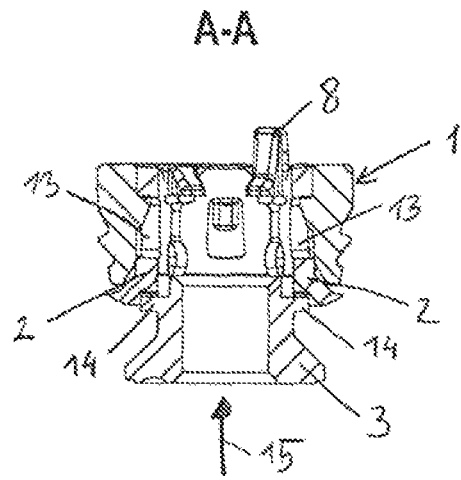
Figure 6C:
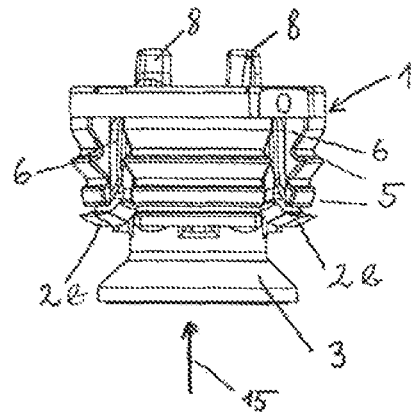
Figure 6B:
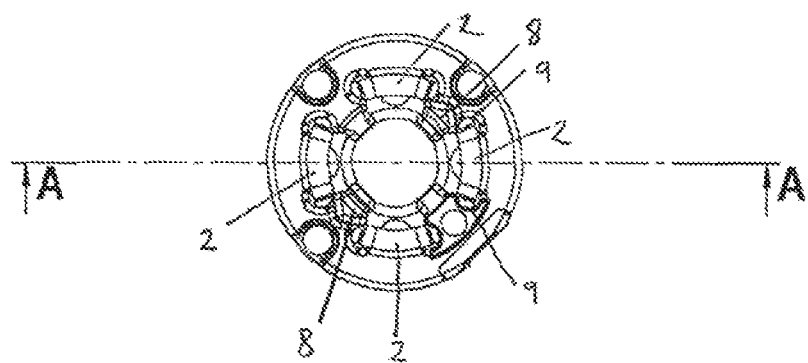

As FIGS. 6a through 6c show the spreading element 3 is then inserted from below in the direction of the arrow 15 into the dowel sleeve 1 which is already provided with the four fastening claws 2. The latching projections 14 of the spreading element 3 then latchingly engage into the latching openings 13 of the fastening claws 2, in which case the fastening claws 2 are firstly urged away from each other and then snapped back again when the latching projections 14 have reached the latching openings 13.

Figure 7:
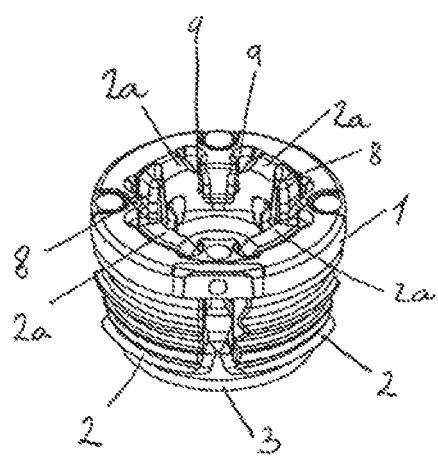
FIG. 7 is a perspective view of the finished dowel in accordance with the preceding embodiments.

Finally, the procedure arrives at the finished dowel shown in FIG. 7, which is distinguished by few components and a compact structural configuration. The outside dimensions of the dowel are substantially cylindrical. The dowel which is not spread in FIG. 7 is advantageously of a diameter of 8 mm to 15 mm, preferably about 10 mm.

The length as measured in the direction of insertion is preferably 5 mm to 8 mm and particularly preferably about 6 mm. In that way the dowel can be inserted even into very thin panels or pieces of articles of furniture, which permit only shallow depths for the bores. Nonetheless, by virtue of the double holding action by way of the spread-apart dowel sleeve 1 on the one hand and the cutting edges of the fastening claws 2 on the other hand, this arrangement provides an outstanding holding action in materials of the most widely differing configuration and hardness. The fastening claws 2 bear at the inside against the dowel sleeve 1 and preferably extend at least over the entire length of the dowel sleeve 1.

Figure 8A:
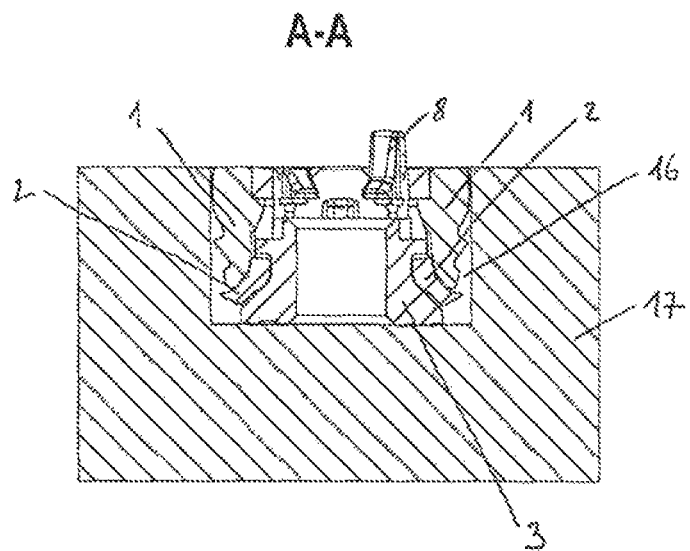
FIGS. 8a, 8b are a sectional view and a plan view illustrating the dowel of FIG. 7 in a bore in a piece of an article of furniture or a panel, with the dowel not yet spread open, FIGS. 9a-9c respectively are a sectional view, a plan view and a side view illustrating the insertion of a spreading element into a dowel sleeve already provided with four fastening claws, in an embodiment without anti-rotation means.
Figure 8B:
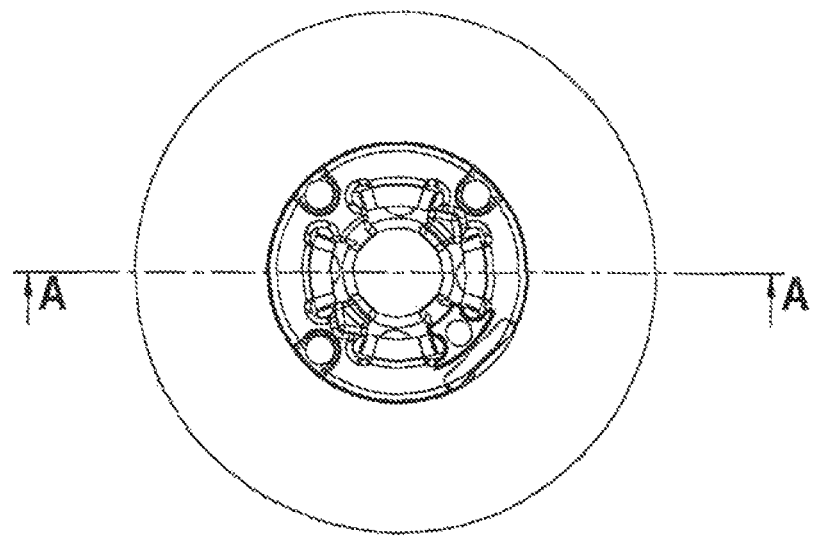
Figure 11A:
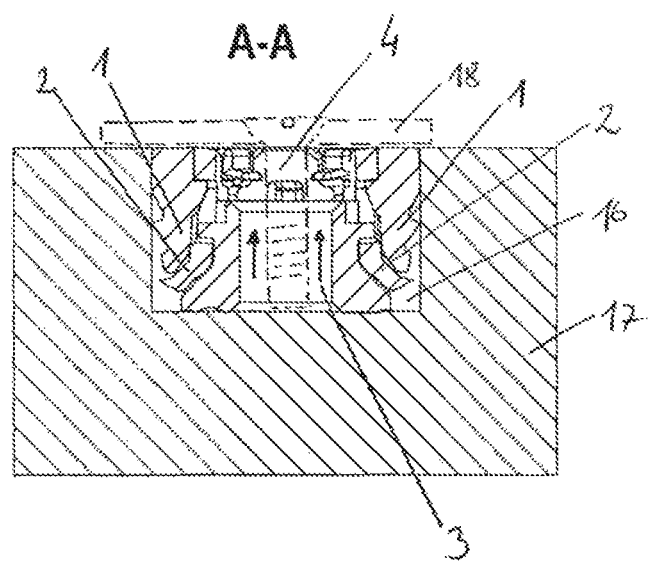
FIGS. 11a, 11b are a sectional view and a plan view of a dowel without anti-rotation means inserted into a bore in a piece of an article of furniture or a panel (in the state of not yet being spread)

FIGS. 8a and 8b show an embodiment of a dowel which is provided with an anti-rotation element and which is fitted into a bore 16 in a panel or a part 17 of an article of furniture (non-spread state). By tightening the spreading element 3 upwardly the fastening claw 2 and the dowel sleeve 1 are urged radially outwardly, as will be described in greater detail later with reference to FIG. 11a and subsequent.

Figure 9A:
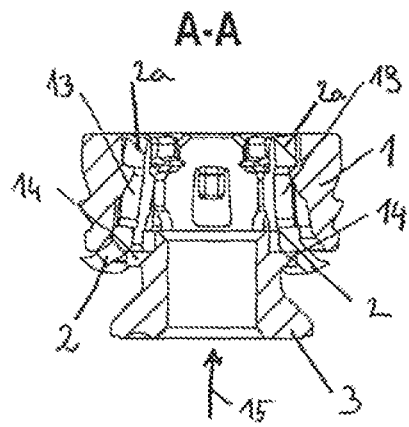
Figure 9C:
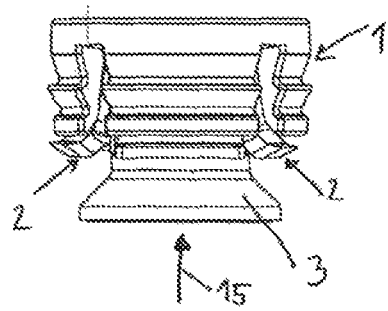
Figure 9B:
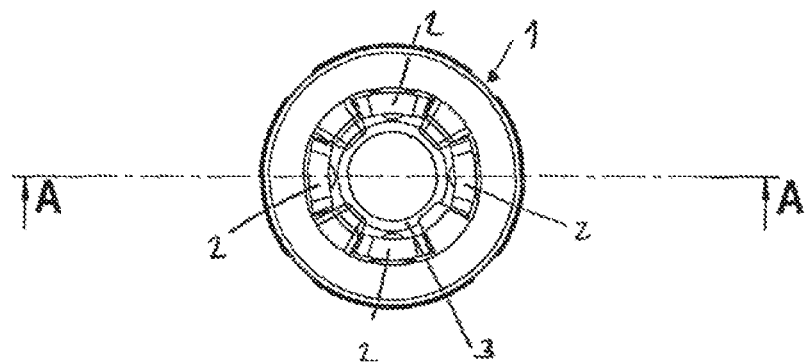
Figure 10A:
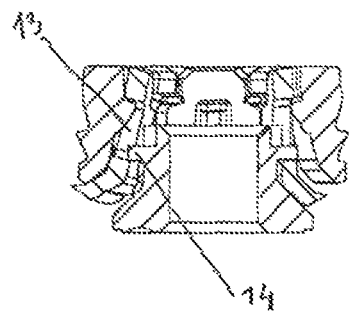
FIGS. 10a-10c show the insertion process at a later moment in time; at the right the spreading element is already latched into the right-hand fastening claw while at the left that latching engagement is just taking place in the fastening claw.
Figure 10C:
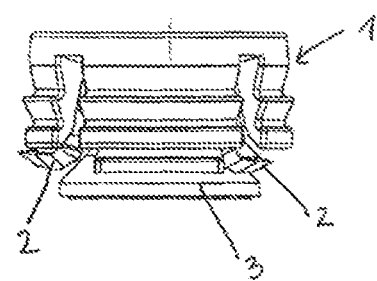
Figure 10B:
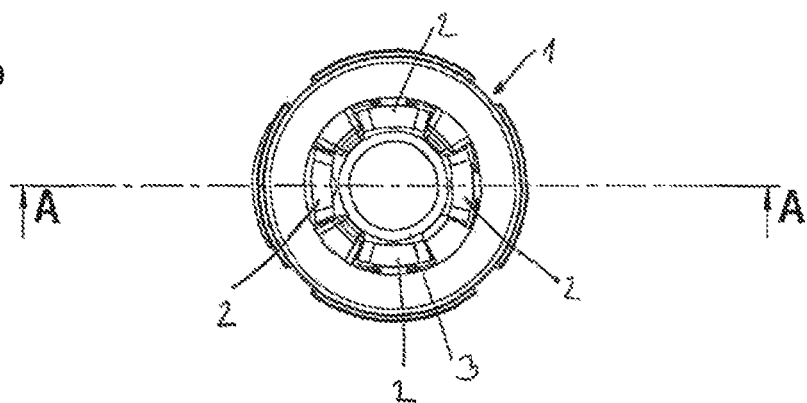

Firstly however reference is made to an embodiment without anti-rotation element to show once again insertion of the spreading element 3 into the dowel sleeve 1, into which four fastening claws 2 are already fitted. By pushing the spreading element 3 upwardly in the direction of the arrow 15 the fastening claws 2 are firstly urged apart laterally, as is shown by reference to the left-hand fastening claw 2 in FIG. 9a. They then snap back and the latching projections 14 latchingly engage into the latching openings 13 in the holding portions 2a of the fastening claws 2, as is shown in FIGS. 10a, 10b and 10c.

Figure 11B:
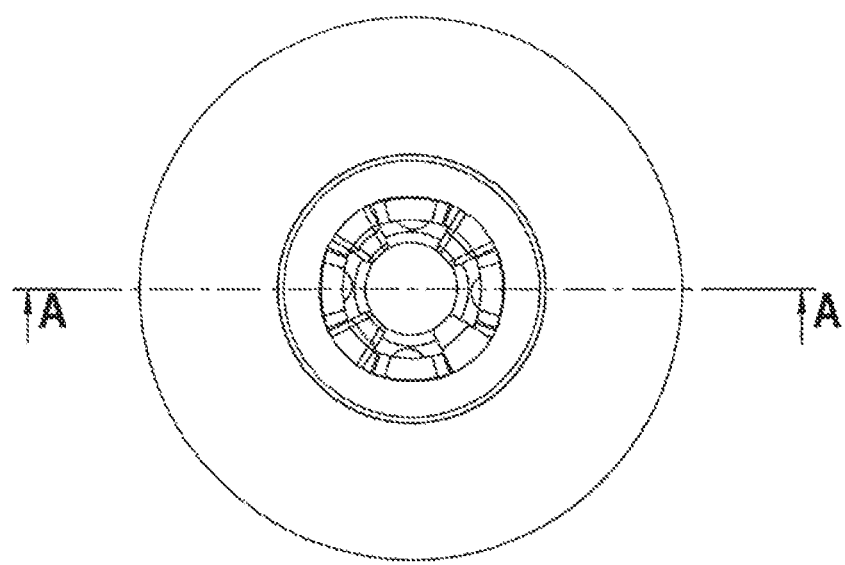
Figure 12A:
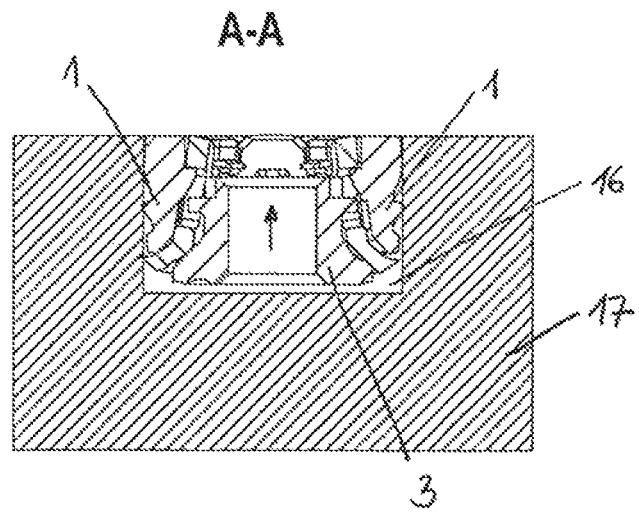
FIGS. 12a, 12b are the same view in the spread state when involving a hard material, for example stone or hard wood.
Figure 12B:
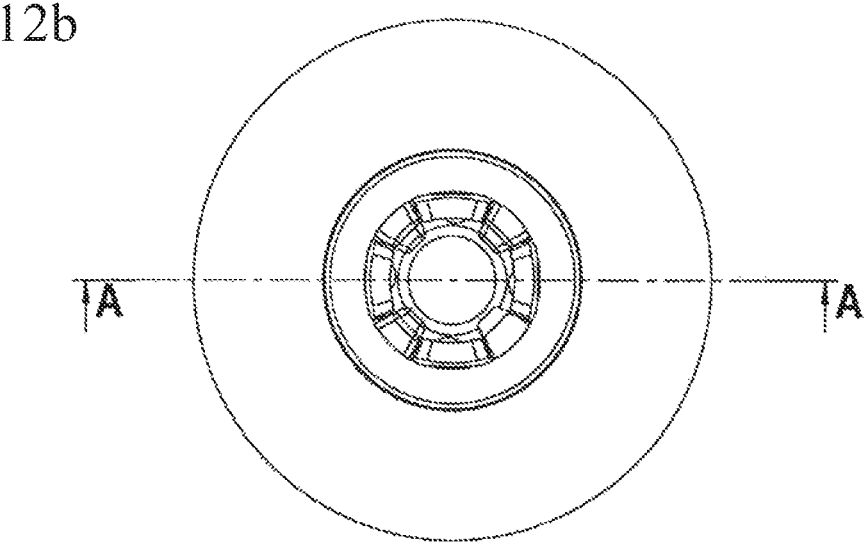

Referring to FIG. 11 a dowel without an anti-rotation element is inserted into a bore 16 in a panel or a part 17 of an article of furniture. A fitment—for example a holding plate of a hinge—is indicated with broken lines and denoted by reference 18. A pulling element in the form of a screw 4 bears with its head against the fitment 18 and extends downwardly in a thread in the spreading element 3. By the screw 4 being tightened the spreading element 3 is pulled up in the direction indicated by the arrow and in that case firstly urges the four fastening claws 2 radially outwardly, which then also entrain outwardly the elastic dowel sleeve 1 which comprises plastic material, thereby resulting in spreading and fastening of the dowel within the bore 16, as FIGS. 12a, 12b show. This involves a relatively hard material for the panel 18 and the corresponding part of the article of furniture, for example plastic stone or hard wood. Here the holding action is predominantly achieved by way of the soft dowel sleeve 1 which holds clampingly to the inside of the bore 16.

Figure 13A:
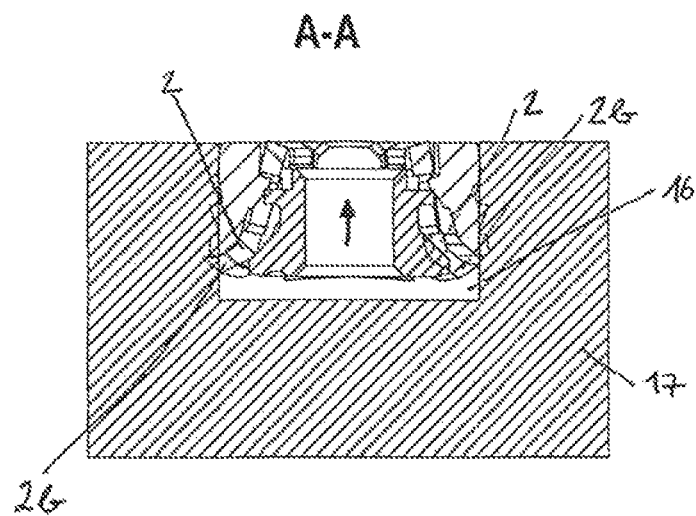
FIGS. 13a, 13b are corresponding views with a wider spreading state in relation to a softer material like for example soft wood or chipboard panels.
Figure 14A:
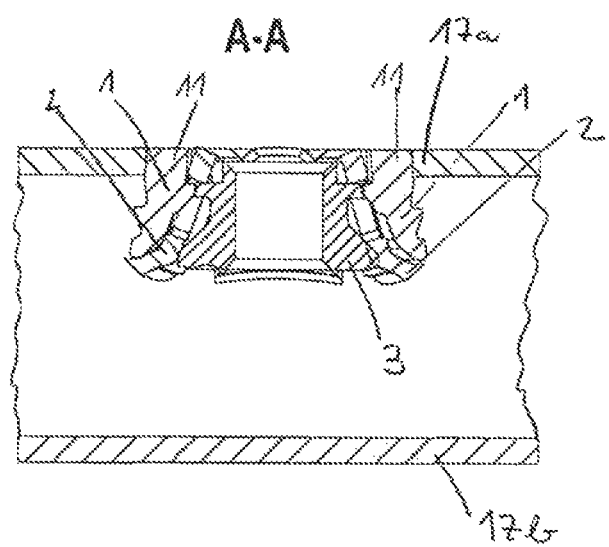
FIGS. 14a, 14b are corresponding views in relation to a lightweight panel with dowel at maximum spread.

The screw 4 with fitment 18 is moreover no longer shown in FIGS. 12a, 13a and 14a for reasons of simplicity. Those elements are naturally present in order to pull the spreading element 3 upwardly.

Figure 13B:
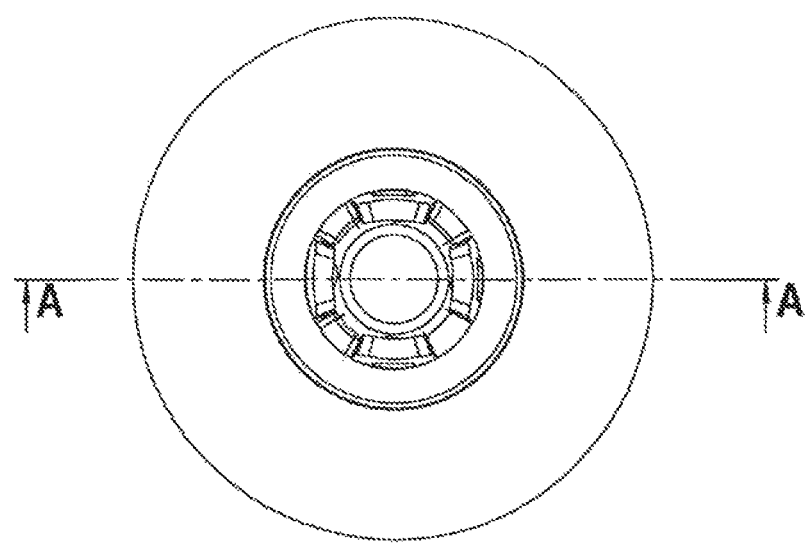

FIGS. 13a and 13b show the circumstances which occur when the material of the panel or the part of the article of furniture is softer, for example a chipboard panel or soft wood. Then the cutting portion 2b of the fastening claws 2 penetrates into the material at least on one side and affords a secure hold for the dowel.

Figure 14B:
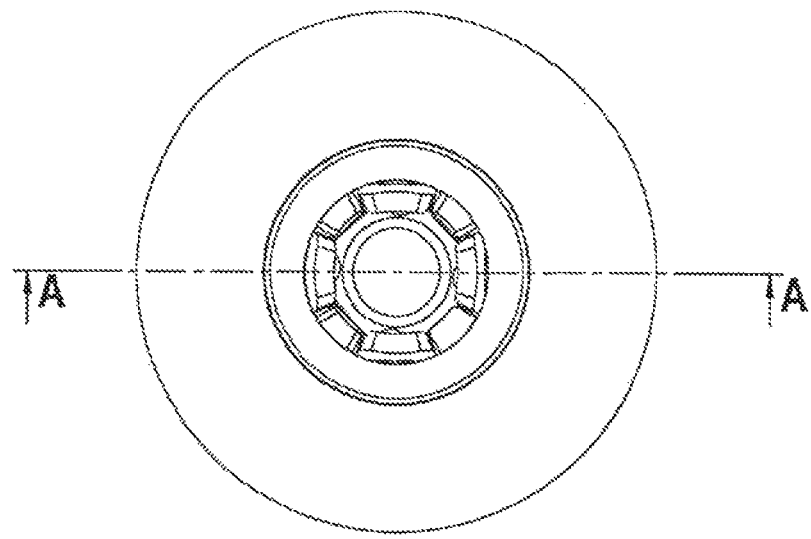

FIGS. 14a and 14b show the situation in relation to lightweight panels. Here the dowel is spread to its maximum, that is to say the spreading element 3 is pulled to the furthest extent upwardly. The fastening claws 2 themselves and the lower end of the dowel sleeve 1 lie in the free space within the lightweight panel which includes two firmer thinner panel portions 17a, 17b which are arranged at a spacing relative to each other. The holding action is afforded by virtue of the fact that the uppermost ring 11 of the dowel is also spread when the spreading element 3 is pulled firmly upwardly. That action is sufficient to achieve a holding action in the upper panel 17a.

Figure 15:
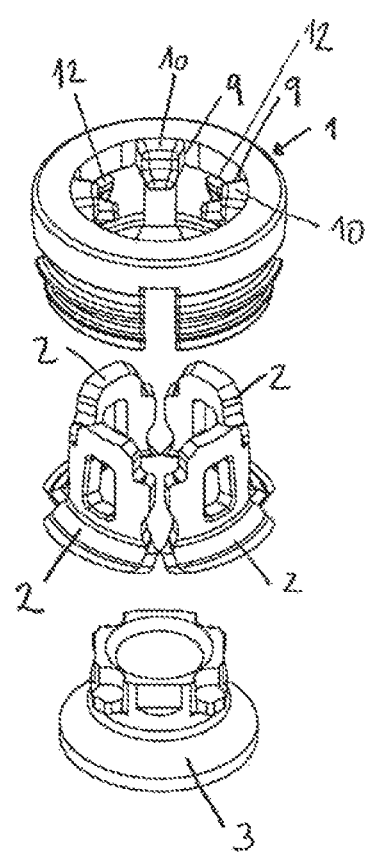
FIG. 15 is a diagrammatic exploded view of a further embodiment of a dowel with a guide of a different configuration.

The embodiment shown in FIG. 15 also involves a dowel without anti-rotation element. Here the lateral guides 9 which are formed by projections 10 are of a somewhat simpler configuration than in the case of the dowel shown hereinbefore.

Figure 16:
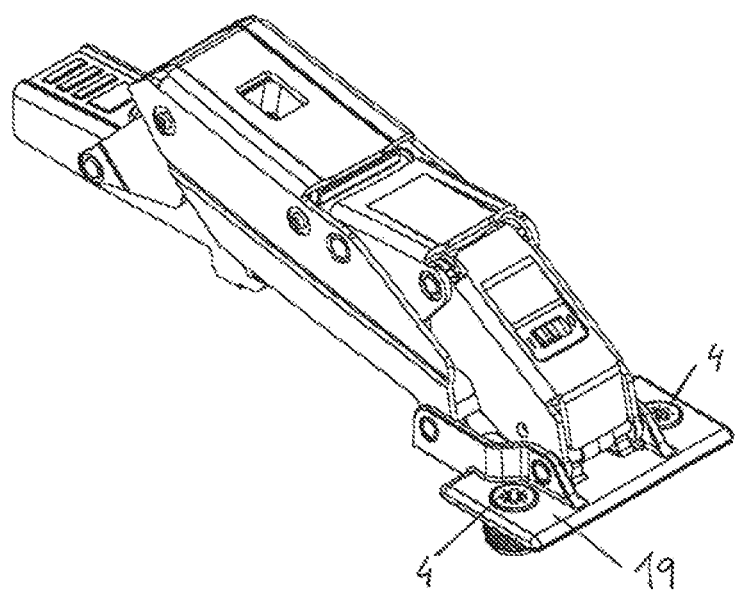
FIG. 16 is a perspective view of a fitment in the form of a hinge with two pre-fitted dowels.

FIG. 16 shows a hinge as an example of a fitment, the fastening plate 19 of which is provided with two dowels according to the invention, which are already pre-fitted by way of the screws 4. In that way the relatively small dowels cannot be lost and they can be fitted securely in position in pre-provided bores 16.

Figure 17:
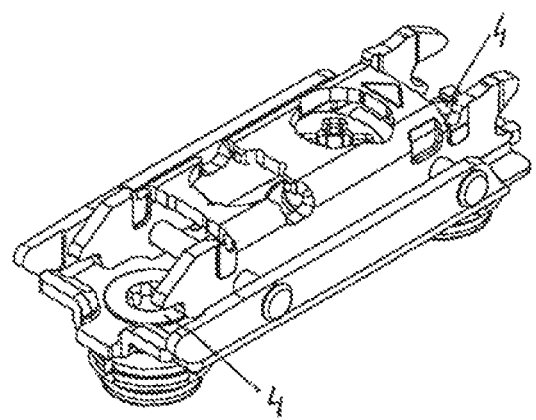
FIG. 17 is a perspective view of the base plate of a hinge with two pre-fitted dowels.
Figure 18:
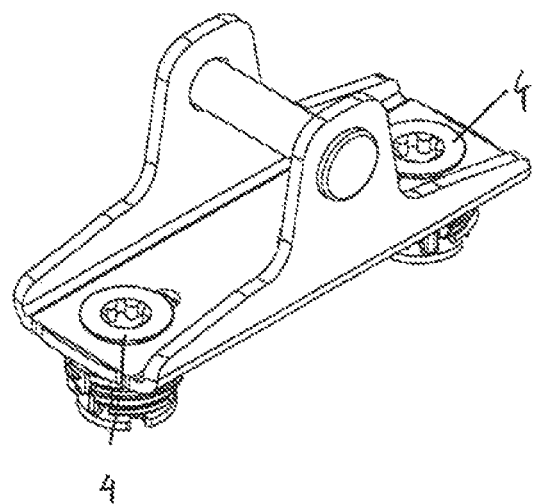
FIG. 18 shows a front wall holder of a drawer with two pre-fitted dowels.
Figure 19:
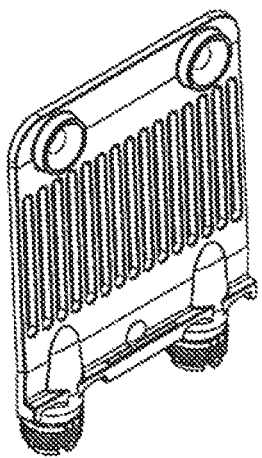
FIG. 19 shows a device for panel stabilization with two pre-fitted dowels.
Figure 21A:
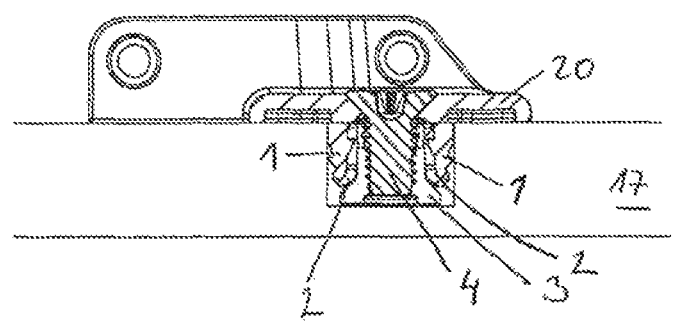
FIGS. 21a, 21b are a sectional view and a plan view also illustrating the connecting plate of a hinge with only one pre-fitted dowel together with pulling means in the form of a screw in the non-spread state.
Figure 21B:
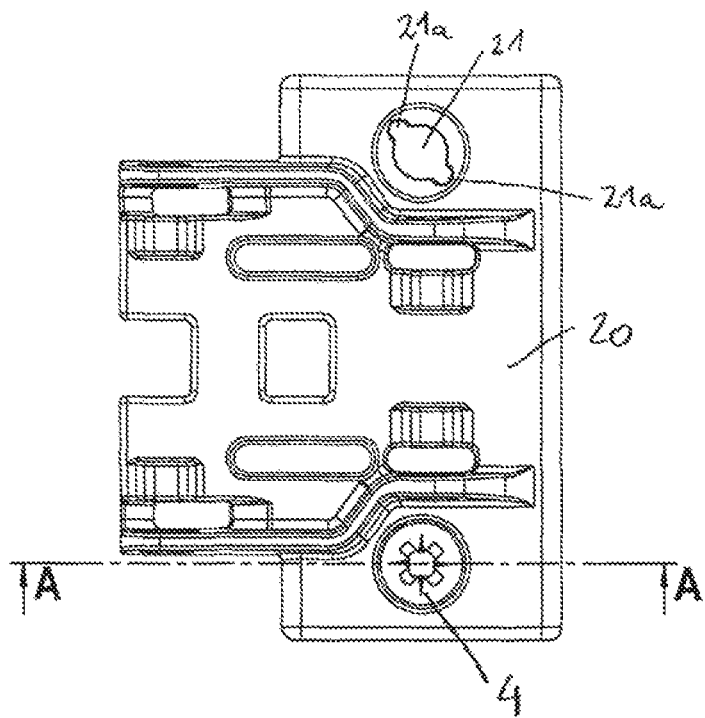

The same also applies to the following embodiments. FIG. 17 shows a base plate for a hinge, FIG. 18 shows a front wall holder, and FIG. 19 shows a panel stabilization wherein two embodiments of dowels according to the invention are respectively pre-fitted. FIGS. 20*a*, 20*b*, 21*a*, 21*b* and 22*a* and 22*b* show various versions of dowels in various positions for fastening a connecting plate 20 of a hinge. FIGS. 20*a*, 20*b* show a dowel with anti-rotation element 8 in the state of not yet being tightened. FIGS. 21*a*, 21*b* show a version without anti-rotation element, also in the state of not being tightened but with the screw 4 already inserted.

FIG. 21*b* shows in the upper opening of the fastening plate 20 of the hinge that that opening is of a non-rotationally symmetrical configuration. The anti-rotation element 8 can engage into the recesses 21*a*, as FIG. 20*b* shows, and thus prevent the dowel also being rotated when the screw 4 is tightened.

FIGS. 22*a* and 22*b* show substantially the same views as FIGS. 21*a*, 21*b* but with the screw 4 tightened and thus the dowel spread, which is thus fixedly held in the bore 16 in the panel 17.

The invention claimed is:

1. A dowel for fastening fitments of articles of furniture, the dowel comprising:
   a dowel sleeve;
   a fastening claw separate from the dowel sleeve;
   a spreading element moveable axially in the dowel sleeve for radially spreading the fastening claw and the dowel sleeve; and
   a latching element configured to hold the fastening claw;
   wherein the dowel sleeve has a guide configured to laterally guide a holding portion of the fastening claw, and the latching element is configured to hold the fastening claw when the fastening claw is inserted into the guide on the dowel sleeve, and
   wherein the latching element is separate from the guide of the dowel sleeve.

2. The dowel as set forth in claim 1, wherein the fastening claw is one of at least two separate oppositely disposed fastening claws.

3. The dowel as set forth in claim 2, wherein the dowel sleeve has a respective separate guide and a respective separate latching element for each of the at least two fastening claws.

4. The dowel as set forth in claim 1, wherein the latching element includes a latching pin protruding inwardly from the dowel sleeve and a corresponding latching opening in the holding portion of the fastening claw, the latching pin being configured to engage into the latching opening when the fastening claw is inserted into the dowel sleeve.

5. The dowel as set forth in claim 1, wherein the guide embraces two oppositely disposed edge portions of the holding portion of the fastening claw substantially in a C-shape and/or bears laterally thereagainst.

6. The dowel as set forth in claim 1, wherein the guide is arranged in the interior of the dowel sleeve.

7. The dowel as set forth in claim 1, wherein the dowel sleeve comprises plastic and is made in one piece.

8. The dowel as set forth in claim 1, wherein the fastening claw has a cutting portion curved in a sickle shape and projecting outwardly with a sharp edge.

9. The dowel as set forth in claim 1, wherein the holding portion of the fastening claw has a substantially rectangular latching opening forming part of the latching element.

10. The dowel as set forth in claim 1, wherein the fastening claw comprises metal and is made in one piece.

11. The dowel as set forth in claim 1, wherein the spreading element is configured to be connected to the fastening claw.

12. The dowel as set forth in claim 4, wherein the latching pin of the dowel sleeve and a latching projection of the spreading element latch into the latching opening in the holding portion of the fastening claw.

13. The dowel as set forth in claim 1, wherein the spreading element comprises metal and is made in one piece.

14. The dowel as set forth in claim 1, wherein the dowel has a substantially cylindrical configuration in outside dimensions thereof.

15. The dowel as set forth in claim 1, wherein the dowel in a non-spread state has a diameter of 8 mm to 15 mm.

16. The dowel as set forth in claim 1, wherein the dowel in a non-spread state has a length—measured in a direction of insertion—of 5 mm to 8 mm.

17. The dowel as set forth in claim 1, wherein a length of the dowel is less than 70% of a diameter of the dowel.

18. The dowel as set forth in claim 1, wherein the fastening claw bears at an inside against the dowel sleeve and extends over an entire length of the dowel sleeve.

19. A method of assembling the dowel as set forth in claim 1, the method comprising:
   inserting the fastening claw into the dowel sleeve,
   latching the fastening claw with the dowel sleeve,
   inserting the spreading element into the dowel sleeve provided with the fastening claw, and
   latching the spreading element with the fastening claw.

20. The method as set forth in claim 19, wherein the dowel has at least two fastening claws, wherein the at least two fastening claws are successively in respect of time inserted into the dowel sleeve and latched.

21. The dowel as set forth in claim 1, wherein the latching element is configured to hold the fastening claw with play.

22. The dowel as set forth in claim 1, wherein the fastening claw is one of four pair-wise oppositely disposed fastening claws.

23. The dowel as set forth in claim 15, wherein the dowel in a non-spread state has a diameter of 10 mm.

24. The dowel as set forth in claim 16, wherein the dowel in a non-spread state has a length measured in a direction of insertion of 6 mm.

25. A dowel for fastening fitments of articles of furniture, the dowel comprising:
   a dowel sleeve;
   a fastening claw separate from the dowel sleeve;
   a spreading element moveable axially in the dowel sleeve for radially spreading the fastening claw and the dowel sleeve; and
   a latching element configured to hold the fastening claw;
   wherein the dowel sleeve has a guide configured to laterally guide a holding portion of the fastening claw, and the latching element is configured to hold the fastening claw when the fastening claw is inserted into the guide on the dowel sleeve,
   wherein the guide is arranged in a region of a top side of the dowel sleeve having a continuous ring, and holding tabs having external holding projections extend in a longitudinal direction of the dowel project from the continuous ring, wherein a respective gap is provided between the holding tabs.

26. The dowel as set forth in claim 25, wherein the guide is located inside the continuous ring.

27. The dowel as set forth in claim 26, wherein the guide is in the form of a projection.

28. A dowel for fastening fitments of articles of furniture, the dowel comprising:
- a dowel sleeve;
- a fastening claw separate from the dowel sleeve;
- a spreading element moveable axially in the dowel sleeve for radially spreading the fastening claw and the dowel sleeve; and
- a latching element configured to hold the fastening claw;
- wherein the dowel sleeve has a guide configured to laterally guide a holding portion of the fastening claw, and the latching element is configured to hold the fastening claw when the fastening claw is inserted into the guide on the dowel sleeve,
- wherein the spreading element is configured to be connected to the fastening claw, and
- wherein the spreading element has a taper surface which bears against an inside of the fastening claw to spread the fastening claw.

29. A dowel for fastening fitments of articles of furniture, the dowel comprising:
- a dowel sleeve;
- a fastening claw separate from the dowel sleeve;
- a spreading element moveable axially in the dowel sleeve for radially spreading the fastening claw and the dowel sleeve; and
- a latching element configured to hold the fastening claw;
- wherein the dowel sleeve has a guide configured to laterally guide a holding portion of the fastening claw, and the latching element is configured to hold the fastening claw when the fastening claw is inserted into the guide on the dowel sleeve,
- wherein the spreading element is configured to be connected to the fastening claw, and
- wherein the latching element is arranged between the spreading element and the fastening claw.

30. The dowel as set forth in claim 29, wherein the latching element includes a radially projecting latching projection on the spreading element, the radially projecting latching projection engaging into the latching opening in the holding portion of the fastening claw.

31. A dowel for fastening fitments of articles of furniture, the dowel comprising:
- a dowel sleeve;
- a fastening claw separate from the dowel sleeve;
- a spreading element moveable axially in the dowel sleeve for radially spreading the fastening claw and the dowel sleeve; and
- a latching element configured to hold the fastening claw;
- wherein the dowel sleeve has a guide configured to laterally guide a holding portion of the fastening claw, and the latching element is configured to hold the fastening claw when the fastening claw is inserted into the guide on the dowel sleeve,
- wherein the dowel sleeve has an anti-rotation pin projecting beyond a top side of the dowel sleeve, the anti-rotation pin being configured to engage into an opening or receiving element which is not rotationally symmetrical with respect to the longitudinal axis of the dowel.

32. A fitment for an article of furniture, comprising:
- a pre-fitted dowel including:
  - a dowel sleeve;
  - a fastening claw separate from the dowel sleeve;
  - a spreading element moveable axially in the dowel sleeve for radially spreading the fastening claw and the dowel sleeve; and
  - a latching element configured to hold the fastening claw;
  - wherein the dowel sleeve has a guide configured to laterally guide a holding portion of the fastening claw, and the latching element is configured to hold the fastening claw when the fastening claw is inserted into the guide on the dowel sleeve;
- a pulling element configured to pull the spreading element of the dowel towards the fitment;
- an anti-rotation pin projecting beyond a top side of the dowel sleeve, the anti-rotation pin being configured to engage into an opening or a receiving element which is not rotationally symmetrical with respect to a longitudinal axis of the dowel; and
- a recess which is not rotationally symmetrical and through which the pulling element extends and into which the anti-rotation pin engages beside the pulling element.

33. The fitment as set forth in claim 32, wherein the pulling element is a screw engaging into a thread in the spreading element.

34. An article of furniture comprising the fitment as set forth in claim 32.

* * * * *